United States Patent
Emadi et al.

(10) Patent No.: US 11,435,438 B2
(45) Date of Patent: Sep. 6, 2022

(54) DYNAMIC SPARSE RADAR ARRAY FOR SCENARIOS

(71) Applicant: Woven Planet North America, Inc., Los Altos, CA (US)

(72) Inventors: Mohammad Emadi, San Jose, CA (US); Jamaledin Izadian, San Jose, CA (US)

(73) Assignee: Woven Planet North America, Inc., Los Altos, CA (US)

( * ) Notice: Subject to any disclaimer, the term of this patent is extended or adjusted under 35 U.S.C. 154(b) by 155 days.

(21) Appl. No.: 16/729,937

(22) Filed: Dec. 30, 2019

(65) Prior Publication Data

US 2021/0199755 A1    Jul. 1, 2021

(51) Int. Cl.
| | | |
|---|---|---|
| *G01S 7/03* | (2006.01) | |
| *G01S 13/931* | (2020.01) | |
| *H01Q 3/24* | (2006.01) | |
| *H01Q 1/32* | (2006.01) | |

(52) U.S. Cl.
CPC ............ *G01S 7/032* (2013.01); *G01S 13/931* (2013.01); *H01Q 1/3233* (2013.01); *H01Q 3/247* (2013.01)

(58) Field of Classification Search
CPC ..... G01S 7/032; G01S 13/931; H01Q 1/3233; H01Q 3/247; H01Q 21/00; H01Q 21/06
See application file for complete search history.

(56) References Cited

U.S. PATENT DOCUMENTS

| | | | | |
|---|---|---|---|---|
| 3,965,475 A | * | 6/1976 | Deerkoski | G01S 13/4409 343/781 CA |
| 4,467,328 A | * | 8/1984 | Hacker | G01S 7/38 342/368 |
| 5,038,149 A | * | 8/1991 | Aubry | H01Q 21/22 343/893 |
| 5,294,933 A | * | 3/1994 | Lee | G01S 13/90 342/201 |
| 5,808,962 A | * | 9/1998 | Steinberg | G01S 15/8925 342/179 |
| 7,081,847 B2 | * | 7/2006 | Ziller | H01Q 25/002 342/158 |

(Continued)

FOREIGN PATENT DOCUMENTS

| | | |
|---|---|---|
| EP | 1788408 A1 | 5/2007 |
| KR | 20150055380 A | 5/2015 |

OTHER PUBLICATIONS

International Search Report and Written Opinion for International Application No. PCT/US2020/066818, dated Apr. 15, 2021.

*Primary Examiner* — Peter M Bythrow
(74) *Attorney, Agent, or Firm* — Christopher G. Darrow; Darrow Mustafa PC

(57) ABSTRACT

In one embodiment, a method includes determining one or more transmission criteria for a radar system. The radar system having a number of antenna elements. The method also includes determining a configuration of a selected subset of the number of antenna elements satisfying the one or more transmission criteria; configuring a switching network to couple each antenna element of the selected subset of antenna elements to a corresponding receiving channel and a corresponding transmitting channel; and causing the radar system to transmit and receive signals using the selected subset of antenna elements.

20 Claims, 16 Drawing Sheets

(56) References Cited

U.S. PATENT DOCUMENTS

| | | | | |
|---|---|---|---|---|
| 7,268,722 B2* | 9/2007 | Gottwald | | H01Q 3/247 |
| | | | | 342/107 |
| 7,498,970 B2* | 3/2009 | Yoshida | | H01Q 13/106 |
| | | | | 342/81 |
| 8,717,224 B2* | 5/2014 | Jeong | | H01Q 5/42 |
| | | | | 342/93 |
| 9,310,478 B2* | 4/2016 | Gross | | H01Q 1/3233 |
| 9,557,585 B1* | 1/2017 | Yap | | G01S 7/4815 |
| 10,371,797 B1* | 8/2019 | Prados | | G01S 7/03 |
| 10,823,819 B2* | 11/2020 | Loesch | | H01Q 21/065 |
| 2003/0076274 A1* | 4/2003 | Phelan | | H01Q 3/26 |
| | | | | 343/895 |
| 2003/0112172 A1* | 6/2003 | Shinoda | | G01S 13/4463 |
| | | | | 342/149 |
| 2003/0164791 A1* | 9/2003 | Shinoda | | H01Q 3/2605 |
| | | | | 342/149 |
| 2005/0154505 A1* | 7/2005 | Nakamura | | G02B 27/01 |
| | | | | 701/1 |
| 2009/0231182 A1* | 9/2009 | Nishimura | | G01S 3/48 |
| | | | | 342/70 |
| 2009/0267822 A1* | 10/2009 | Shinoda | | G01S 13/4463 |
| | | | | 342/70 |
| 2011/0298676 A1* | 12/2011 | Yanagihara | | H01Q 21/06 |
| | | | | 343/893 |
| 2013/0278456 A1* | 10/2013 | Izumi | | G01S 13/931 |
| | | | | 342/146 |
| 2014/0028493 A1* | 1/2014 | Izumi | | G01S 13/4454 |
| | | | | 342/149 |
| 2014/0133322 A1 | 5/2014 | Steer | | |
| 2014/0354467 A1* | 12/2014 | Gross | | H01Q 1/3233 |
| | | | | 342/147 |
| 2016/0093944 A1* | 3/2016 | Kamo | | H01Q 1/1271 |
| | | | | 348/148 |
| 2016/0285172 A1* | 9/2016 | Kishigami | | G01S 7/023 |
| 2017/0149147 A1* | 5/2017 | Minami | | G01S 7/03 |
| 2017/0168139 A1* | 6/2017 | Lim | | G01S 7/2921 |
| 2018/0088224 A1* | 3/2018 | Kishigami | | H01Q 21/06 |
| 2018/0156891 A1* | 6/2018 | Brune | | G01S 13/4463 |
| 2018/0159246 A1* | 6/2018 | Raphaeli | | H01Q 21/061 |
| 2019/0056491 A1* | 2/2019 | Bialer | | G01S 13/931 |
| 2019/0115670 A1* | 4/2019 | Kishigami | | H01Q 21/0025 |
| 2019/0285738 A1* | 9/2019 | Iwasa | | G01S 7/03 |
| 2019/0308637 A1* | 10/2019 | Shinoda | | B60W 30/182 |
| 2019/0383900 A1* | 12/2019 | Bialer | | G01S 13/42 |
| 2020/0055467 A1* | 2/2020 | Shinoda | | H02M 3/158 |
| 2020/0254947 A1* | 8/2020 | Shinoda | | H02M 3/1584 |
| 2020/0300965 A1* | 9/2020 | Wu | | G01S 13/931 |
| 2020/0371229 A1* | 11/2020 | Levitan | | G01S 13/42 |
| 2021/0041557 A1* | 2/2021 | Lei | | G06F 17/11 |

* cited by examiner

DYNAMIC SPARSE RADAR ARRAY FOR SCENARIOS

BACKGROUND

A vehicle with a driving-control system may be a vehicle that is capable of sensing its environment and navigating with reduced to no human input. The vehicle may be equipped with a variety of systems or modules for enabling it to determine its surroundings and safely navigate to target destinations. For example, the driving-control system may be an integrated computing system (e.g., one or more central processing units, graphical processing units, memory, and storage) for controlling various operations of the vehicle, such as driving and navigating. To that end, the driving-control system may process data from one or more sensor arrays. For example, an autonomous vehicle may have optical cameras for, e.g., recognizing roads and lane markings; infrared cameras for, e.g., night vision; LiDARs for, e.g., detecting 360° surroundings; radar for, e.g., detecting distant hazards; stereo vision for, e.g., spotting hazards such as pedestrians or tree branches; wheel sensors for, e.g., measuring velocity; ultrasound for, e.g., parking and obstacle detection; global positioning system (GPS) for, e.g., determining the vehicle's current geolocation; and/or inertial measurement units, accelerometers, gyroscopes, and/or odometer systems for movement or motion detection. Data from these systems and modules may be used by the driving-control system to safely guide or assist the navigation of the vehicle.

Driving-control systems have a limited computational budget (e.g., terms of computing time and power) for performing critical navigation functions, such as, for example, perception of agents in the surrounding environment or prediction of the future locations of these agents. Different agents in the field of view (FOV) of the radar may have different azimuth angles that need to be determined with high resolution, which processes a large amount of radar data that taxes the limited computational and power budget of the vehicle. Typically, each antenna element is coupled to a receiving circuit that each consumes substantial power and while increasing the number of antenna elements widens the radar FOV, it also leads to an untenable power situation for the vehicle.

DESCRIPTION OF EXAMPLE EMBODIMENTS

Figure 1:
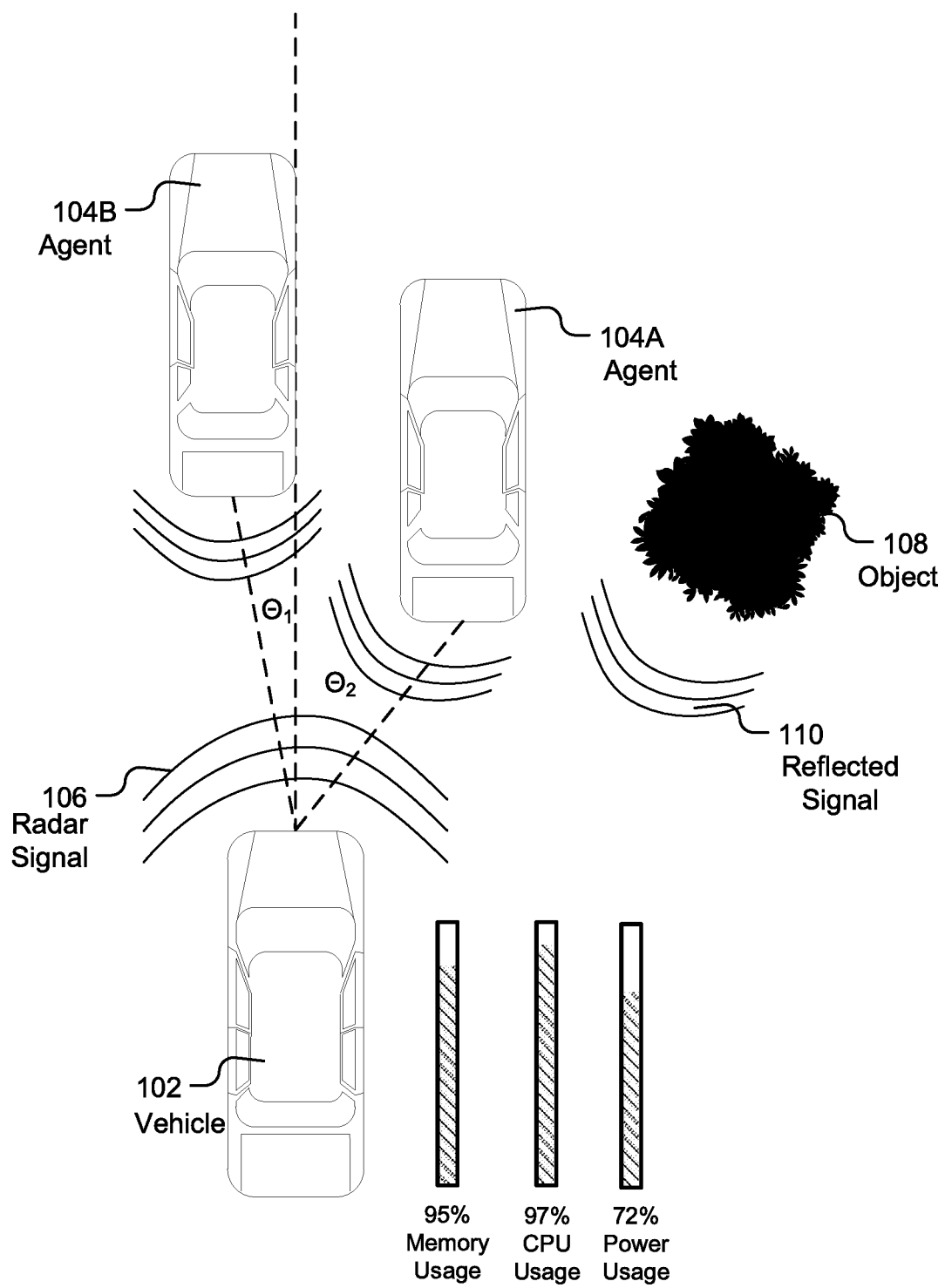
FIG. 1 illustrates an example scenario of a vehicle detecting objects using a full radar array.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. In addition, the embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Subject matter described herein is generally directed to configuring a radar antenna array to determine the azimuth angle of agents with reduced power consumption and reduced computational resources. A vehicle with a driving-control system may be a vehicle that is capable of sensing its environment and navigating with reduced to no human input. The vehicle may be equipped with a variety of systems or modules for enabling it to determine its surroundings and safely navigate to target destinations. For example, the driving-control system may be an integrated computing system (e.g., one or more central processing units, graphical processing units, memory, and storage) for controlling various operations of the vehicle, such as driving and navigating. To that end, the driving-control system may process data from one or more sensor arrays. For example, an autonomous vehicle may have optical cameras for, e.g., recognizing roads and lane markings; infrared cameras for, e.g., night vision; LiDARs for, e.g., detecting 360° surroundings; radar for, e.g., detecting distant hazards; stereo vision for, e.g., spotting hazards such as pedestrians or tree branches; wheel sensors for, e.g., measuring velocity; ultrasound for, e.g., parking and obstacle detection; global positioning system (GPS) for, e.g., determining the vehicle's current geolocation; and/or inertial measurement units, accelerometers, gyroscopes, and/or odometer systems for movement or motion detection. Data from these systems and modules may be used by the driving-control system to safely guide or assist the navigation of the vehicle.

Driving-control systems have a limited computational budget (e.g., in terms of time and resources) and power budget for performing important navigation functions, such as, for example, perception of agents in the surrounding environment or prediction of the future locations of these agents. A perception module of the driving-control system processes the data from the sensors of the vehicle and generates a representation of the current state of the vehicle's environment, including agents that may be hazards to the vehicle. Depending on the number and type of sensors, the amount of sensor data that needs to be processed to generate the representation of the environment and identify agents may be immense, which may tax the limited computational budget of the driving-control system.

It is useful for the driving-control system to reduce the computational and power burden of determining the azimuth angle of the agents in the radar field of view (FOV) to a high degree of accuracy for accurate object detection, characterization, and trajectory prediction. An antenna array of a radar system includes a number of individual antenna elements that may be separately pulsed in a programmed pattern. There are two methods of increasing the radar FOV, either increasing the number of antenna elements of the antenna array or increasing the spacing between antenna elements. Increasing the number of antenna elements increases the complexity of the radar system and the power consumption. Increasing the spacing between antenna elements increases the FOV, but spacings larger than a particular value may result in grating lobes. Grating lobes may occur whenever the spacing between antenna elements in an antenna array is equal to or greater than the wavelength of the transmitted radar signal and leads to registering false images (or "ghosts").

FIG. 1 illustrates an example scenario of a vehicle detecting objects using a full radar array. A driving-control system of a vehicle 102 may receive data from the radar transceiver, as well as, data from other sensors of the sensor array to determine the environment, including agents 104A-104B and objects 108, surrounding vehicle 102. Vehicle 102 may include a sensor array that includes a radio detection and ranging (radar) transceiver. Radar is a detection system that uses radio waves to extract information about the agents in the radar system FOV. As described in more detail below, a radar system that includes a transmitter with channels that transmits electromagnetic waves in the radio frequencies (RF), an antenna array with a number of antenna elements, a receiver with number of receiving channels to receive the data from the antenna elements, and a processor to process the data to determine properties of the objects 108 and agents 104A-104B (e.g., Doppler, range, or azimuth angle). Radar pulses transmitted 106 from the transmitter are reflected by objects 108 and agents 104A-104B in the radar system FOV and are detected by the receiver. The reflected signal 110 is processed to determine the range, azimuth angle, or velocity.

Radar pulses are reflected from objects 108 and agents 104A-104B in the FOV. In particular embodiments, the processor of the radar system may apply beamforming to determine the azimuth angle of objects 108 and agents 104A-104B. Beamforming is a signal processing technique applied to reflected signal 110 received by the antenna array for directional signal reception. The antenna elements of the antenna array are combined so that reflected signal 110 received at particular angles experience constructive interference while reflected signal 110 received at other angles experience destructive interference. Reflected signal 110 received by each antenna element is multiplied by a complex phase through matrix multiplication. When reflected signals 110 from each antenna element are summed to form the output of the array, they would combine coherently.

The full antenna array of the radar system of vehicle 102 may transmit radar signal 106. Radar signal 106 is reflected by objects 108 and agents 104A-104B and reflected signals 110 are received by the antenna elements. As described in more detail above, the driving-control system of vehicle 102 may determine the azimuth angle $\Theta_1$ associated with agent 104B and azimuth angle $\Theta_2$ associated with agent 104A. In many cases, each antenna element of the antenna array is used to transmit radar signal 106 and receive reflected signal 110 to maximize the radar system FOV. As illustrated in the example of FIG. 1, utilizing the entire antenna array leads to a large computational, memory, and power burden on vehicle 102.

Figure 2:
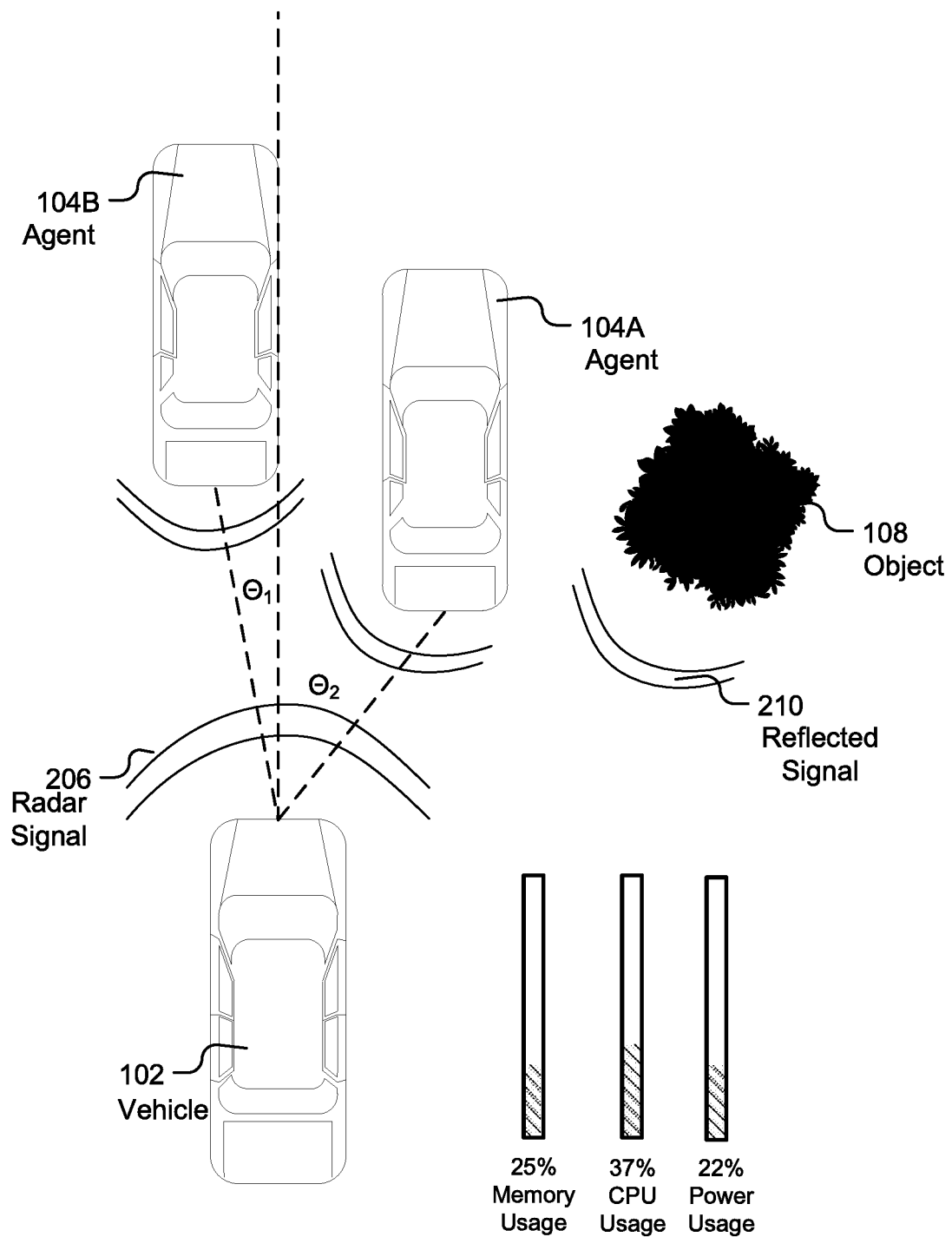
FIG. 2 illustrates an example scenario of a vehicle detecting objects using a smaller subset of an antenna array.

FIG. 2 illustrates an example scenario of a vehicle detecting objects using a smaller subset of an antenna array. In particular embodiments, a subset of the antenna elements of the antenna array of vehicle 102 may transmit radar signal 206 and receive radar signals reflected 210 from objects 108 and agents 104A-104B. The subset of the antenna elements may, be selected based on satisfying one of more transmission criteria. In particular embodiments, the transmission criteria may be determined based on radar parameters associated with a scenario, described in more detail below. As an example and not by way of limitation, the radar parameters associated with a scenario may include an amount or range of the azimuth angle or elevation angle coverage to provide the field of view (FOV) or an amount of signal-to-noise ratio (SNR) of the radar signal to accurately capture the position and movement of agents based on the scenario of vehicle 102. For example, the radar parameter rimy be a 90° azimuth angle FOV, ±20° elevation angle FOV, or 25 dB SNR. In particular embodiments, the transmission criteria may include a resolution or granularity of the azimuth angle or elevation angle within the FOV or a number of antenna elements to achieve a determined amount of SNR of the radar signal to accurately capture the position and movement of agents of concern to the driving system of vehicle 102. As an example and not by way of limitation, the radar parameter may be a 5° azimuth angle resolution, 10° elevation angle resolution, or 13 antenna elements to achieve 25 dB SNR. As described in more detail below, the subset of antenna elements may be configured to achieve a FOV (e.g., a range of azimuth angle) to determine azimuth angle of $\Theta_1$ associated with agent 104B and azimuth angle of $\Theta_2$ associated with agent 104A. As illustrated in the example of FIG. 2, limiting the transmission of radar signal 206 and reception of the reflected radar signal 210 to a subset of antenna elements leads to a significant reduction in the power burden of vehicle 102 and the reduction in the amount of radar data leads to significant reduction in the computational and memory burden on vehicle 102.

Figure 3:
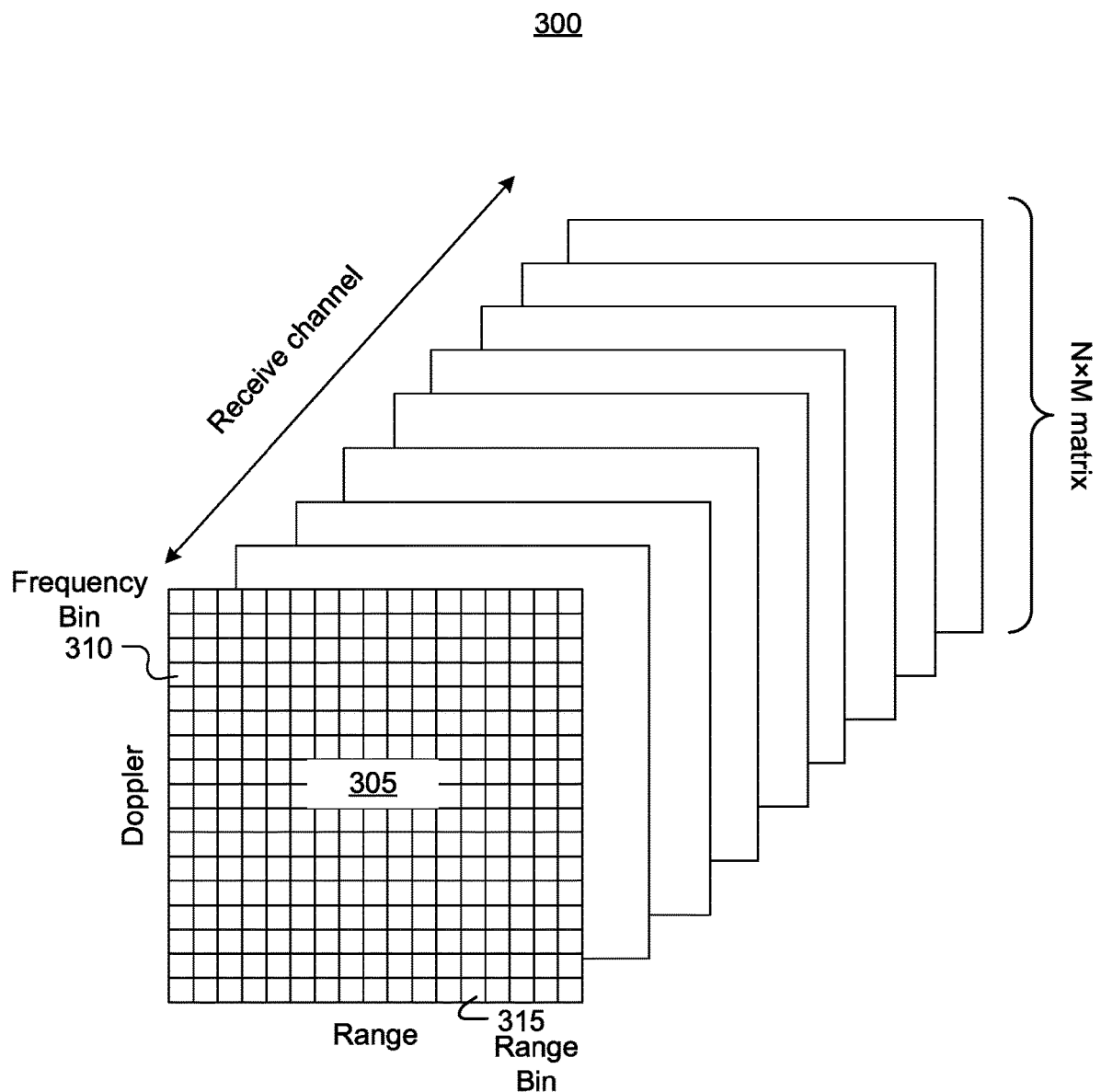
FIG. 3 illustrates an example cube of radar data.

FIG. 3 illustrates an example cube of radar data at a given time. The reflected radar signals may be processed to extract data corresponding to a velocity (Doppler) measurement and distance (range) measurement. The data extracted from the reflected radar signals may form a radar data cube 300 that illustrates the computing and memory resources needed to process the reflected radar signals. In particular embodiments, the Doppler and range data may be stored and processed as a 2D range-Doppler (RD) N×M matrix 305, where N is the number of frequency or Doppler bins 310 of the FFT determining the Doppler measurement and M is the number of range bins 315. Each 2D RD matrix 305 corresponds to one of the receiver channels of the radar system, so the number of 2D range-Doppler matrices 305 formed from the data measured is the number of antenna elements of the antenna array. As the number of receiver channels or antenna elements being used changes, the size of radar cube 300 expands or contracts. Therefore, the computational and memory burden to process the data radar data cube 300 increases or decreases with the number of antenna elements that are connected to receive channels. In other words, if the number of antenna elements used to transmit radar signals and receive the reflected signals from objects, the computational and memory burden to process the data of radar cube 300 increases. By focusing the radar signal transmission and data acquisition to a subset of antenna elements, the computational and memory burden of storing and processing radar data cube 300 may be significantly reduced.

Figure 4:
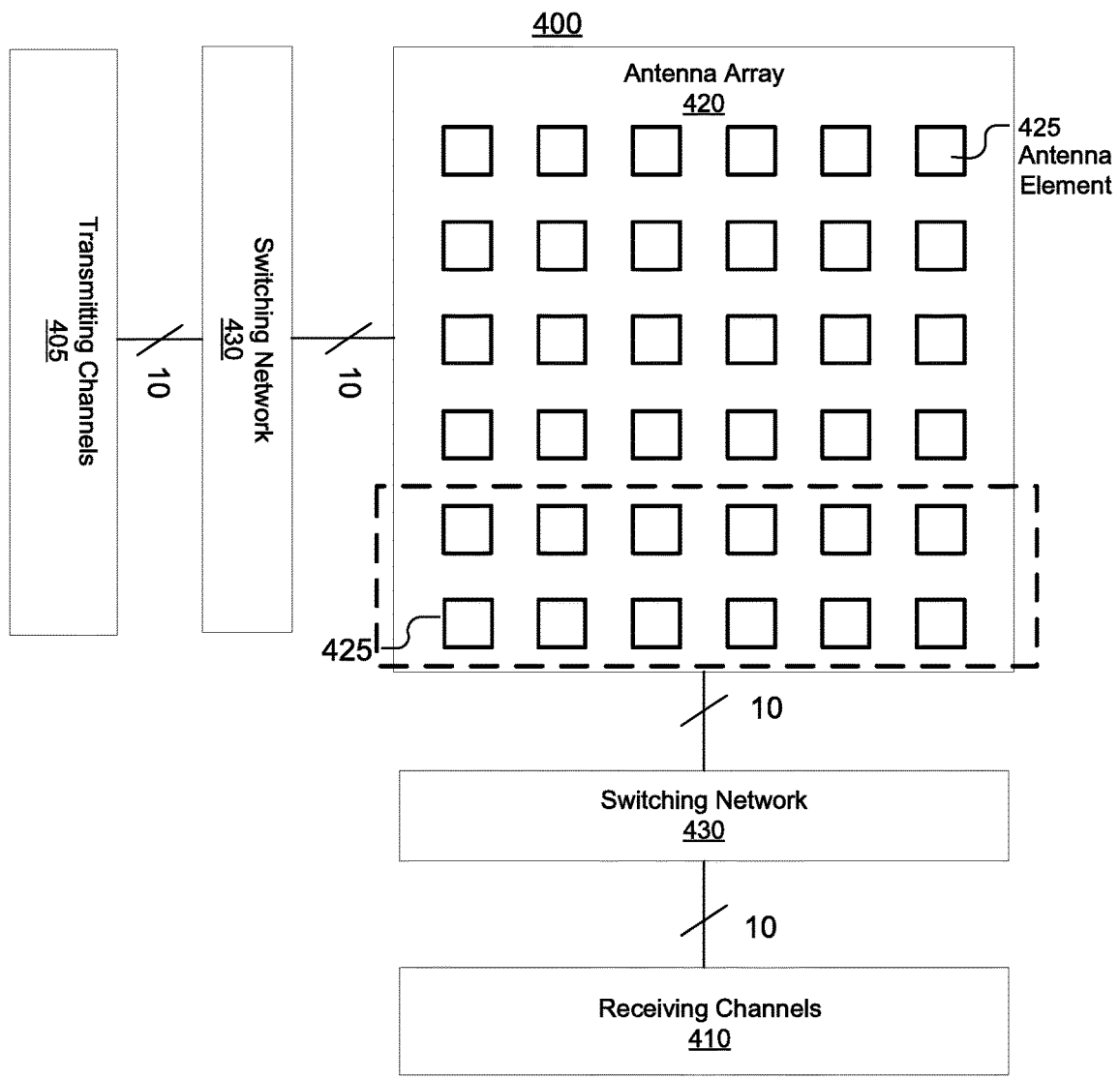
FIG. 4 illustrates an example antenna array with a switching network.

FIG. 4 illustrates an example antenna array with a switching network. As illustrated in the example of FIG. 4, a radar system 400 may include a number of transmitting channels 405, a number of receiving channels 410, an antenna array 420 of pseudo-randomly spaced antenna elements 425, as illustrated and described in the example of FIG. 5, and a switching network 430 that is capable of coupling individual antenna elements 425 of antenna array 420 to a particular transmitting channel 405 and a particular receiving channel 410. In particular embodiments, switching network 430 couples transmitting channels 405 and receiving channels 410 to individual antenna elements 425 through a bus of a size (e.g., 10 lines) corresponding to the number of transmitting channels 405 and receiving channels 410 of radar system 400. As described above in more detail, each antenna element 425 coupled to transmitting channel 405 transmits the radar signals and the reflected signals received by each antenna element 425 is measured by receiving channels 410.

Figure 5:
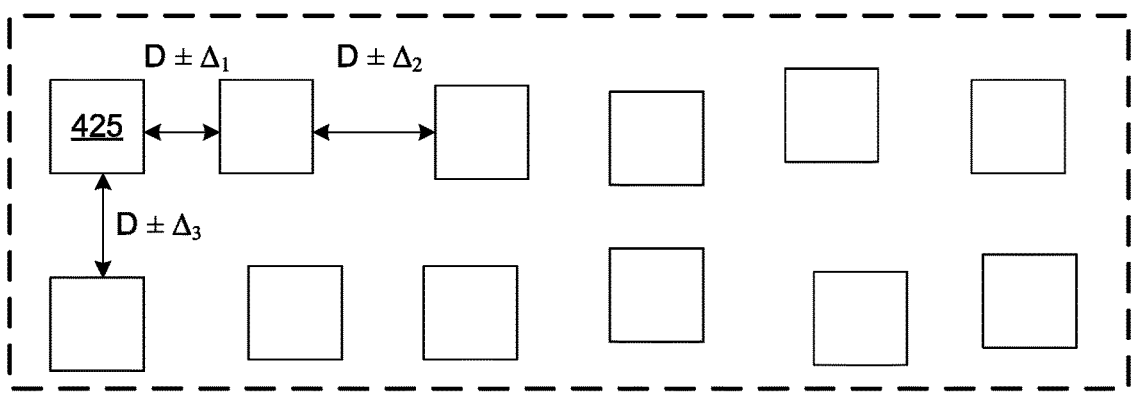
FIG. 5 illustrates an expanded view of a portion of the example antenna array.

FIG. 5 illustrates an expanded view of a portion of the example antenna array. As described in more detail above, increasing the spacing D between antenna elements 425 increases the radar system FOV, but spacings D larger than a particular value may lead to grating lobes. Grating lobes may occur when spacing D between antenna elements 425 in the antenna array is greater than half the wavelength ($\lambda/2$) of the carrier frequency of the transmitted radar signal and leads to registering false images (or "ghosts"). In particular embodiments, antenna elements 425 are spatially distributed with a spacing D with a pseudo-random spacing $\Delta$ between antenna elements 425. As an example and not by way of limitation, this pseudo-random spacing $\Delta$ may take a random value within a particular range. As illustrated in the example of FIG. 5, one horizontal spacing between two adjacent antenna elements 425 may be $D \pm \Delta_1$, another horizontal spacing between two other adjacent antenna elements 425 may be $D \pm \Delta_2$, and vertical spacing between two adjacent antenna elements 425 may be $D \pm \Delta_3$. By spatially distributing antenna elements 425 in a pseudo-random manner the grating lobes resulting from values of spacing larger than $\lambda/2$ of the carrier frequency cancel each other out through superposition of the responses in antenna elements 425. The result of this pseudo-random spacing between antenna elements 425 allows the antenna array to have a larger FOV without extracting spurious data from grating lobes. As an example and not by way of limitation, spacing D may have a value of $0.7\lambda$ and $\Delta$ may have a value of $\pm 0.1\lambda$.

Figure 6:
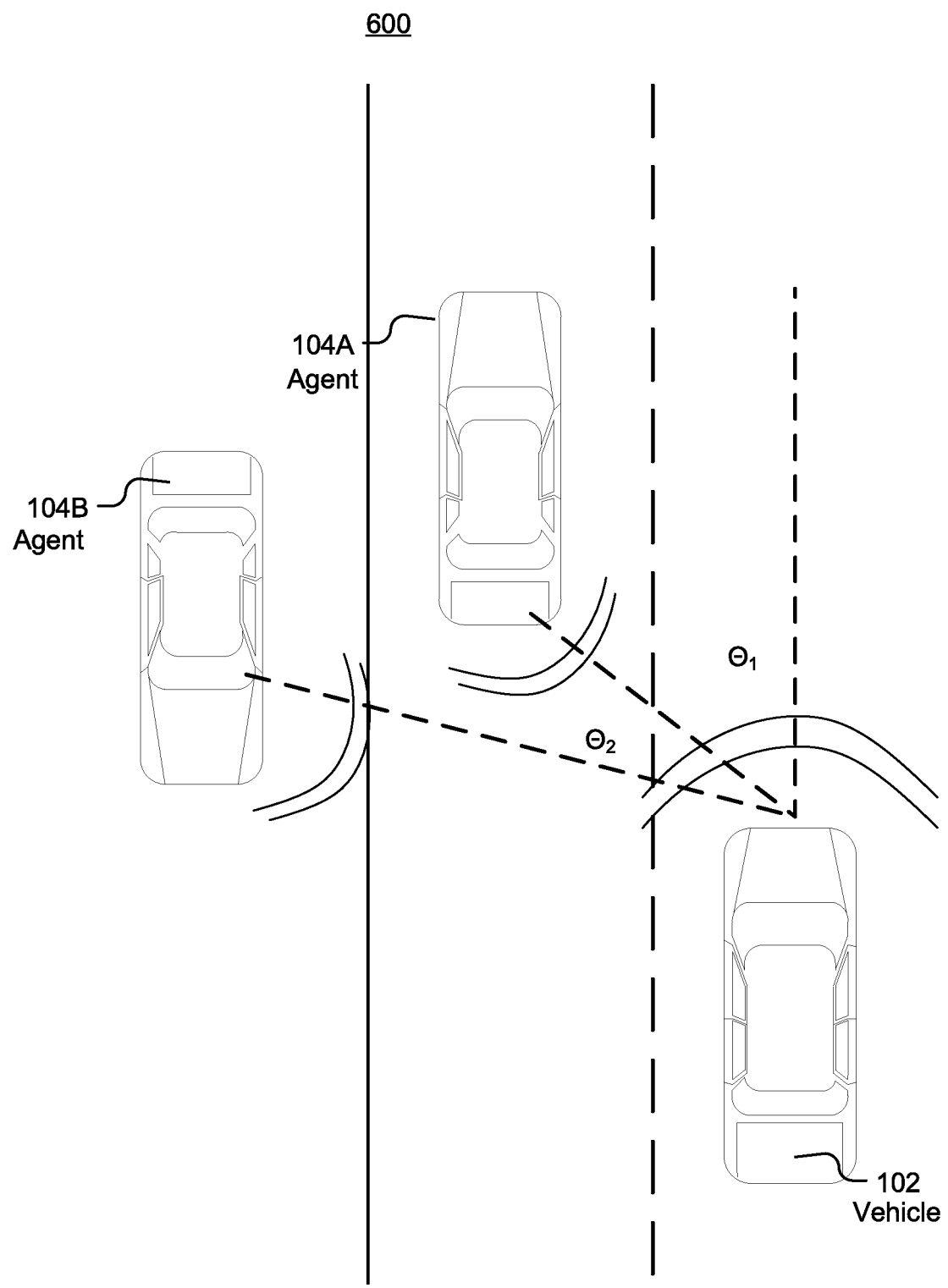
FIG. 6 illustrates an example highway scenario of a vehicle detecting objects using a subset of an antenna array.

FIG. 6 illustrates an example highway scenario of a vehicle detecting objects using a subset of an antenna array. The radar system may selectively activate a subset of antenna elements of the antenna array to determine azimuth angle $\Theta_1$ associated with agent 104B and azimuth angle $\Theta_2$ associated with agent 104A. In particular embodiments, a microprocessor of the radar system may configure the switching network to select a subset of antenna elements of the antenna array based on determining a scenario of the vehicle. As described in more detail below, scenario 600 of the vehicle may be determined based on sensor data (e.g., inertial measurement unit (IMU) or LiDAR), GPS data, map data, or semantic data associated with the map data.

As illustrated in the example of FIG. 6, a scenario 600 may correspond to vehicle 102 traveling on a highway with agent 104A traveling in the same direction and agent 104B traveling in the opposite direction. In particular embodiments, scenario 600 may be determined based on sensor data indicating the location of agents, localization information (e.g., GPS data), and map data indicating vehicle 102 is traveling on a highway. As an example and not by way of limitation, in highway scenario 600, determining azimuth angle $\Theta_1$ associated with agent 104B and azimuth angle $\Theta_2$ associated with agent 104A within the full FOV of the radar system is of particular importance to driving-system navigation, but determining the elevation angle of agents 104A-104B within $\pm 10°$ up to 140 meters of vehicle 102 is sufficient. As an example and not by way of limitation, the radar parameters of scenario 600 may correspond to a 180° azimuth angle and $\pm 10°$ elevation angle FOV with a relatively low SNR to capture agents up to 140 meters of vehicle 102.

Figure 7A:
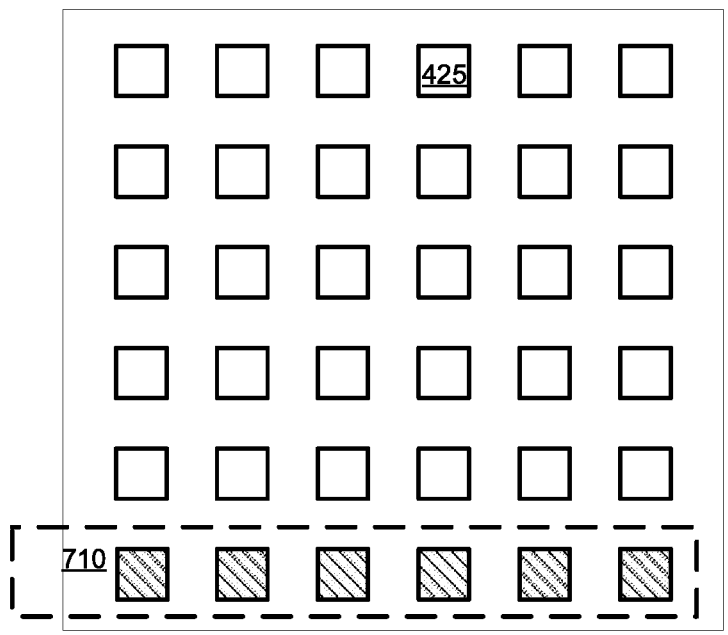
FIG. 7A illustrates an example a subset of antenna elements for a highway scenario.

FIG. 7A illustrates an example subset of antenna elements for a highway scenario. In particular embodiments, the configuration of the subset of antenna elements may be based on a resolution metric in particular spatial dimensions. In the example of FIG. 6, the highway scenario is focused on determining the azimuth angle of agents in the radar system FOV is of particular importance, while determining the elevation angle is primarily useful within a limited range of elevation and distance. Given the radar parameters for the scenario, described in more detail above, example transmission parameters may correspond to a large number of antenna elements 425 along the azimuth dimension to accurately capture the azimuth angle of agents in the FOV, but with a relatively low number of antenna elements 425 to achieve the desired SNR. As illustrated in the example of FIG. 7A, the microprocessor of the radar system may configure the switching network to couple a single row 710 of antenna elements 425 of antenna array 410 corresponding to the azimuth dimension of the vehicle to satisfy the transmission criteria.

Figure 7B:
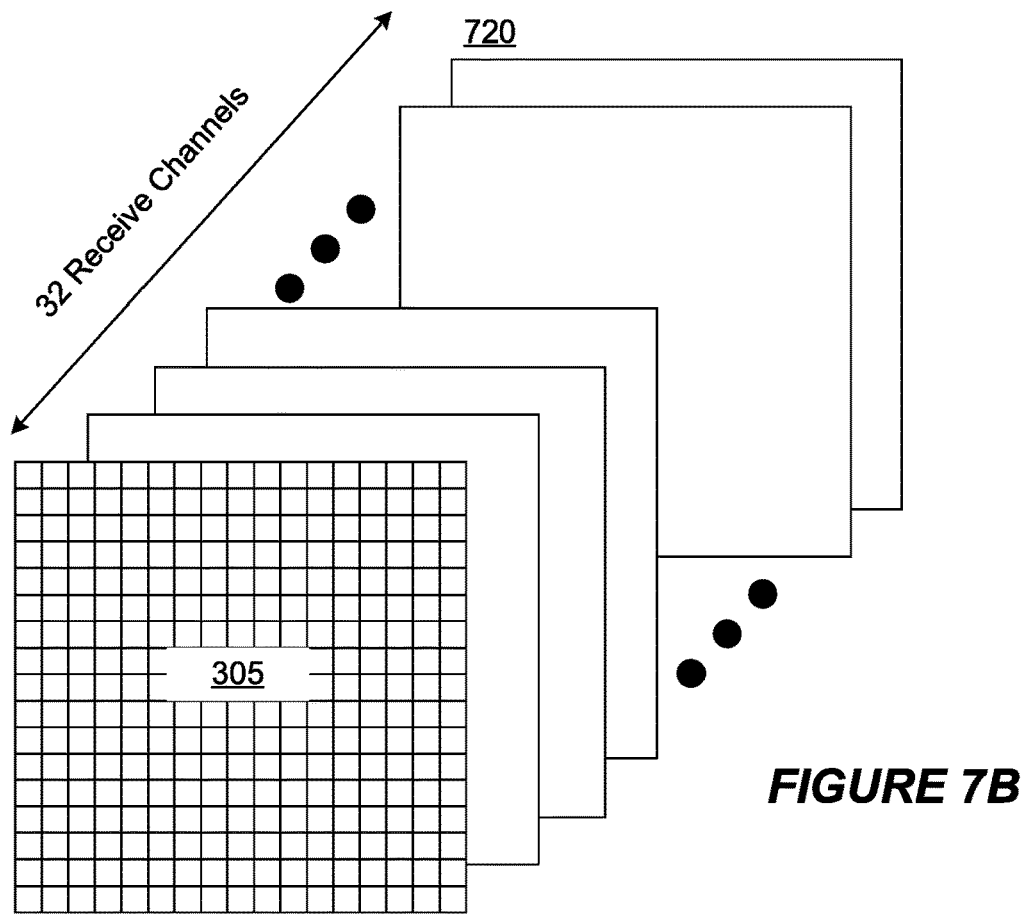
FIGS. 7B-7C illustrate an example reduction of data by using a subset of antenna elements for a highway scenario.
Figure 7C:
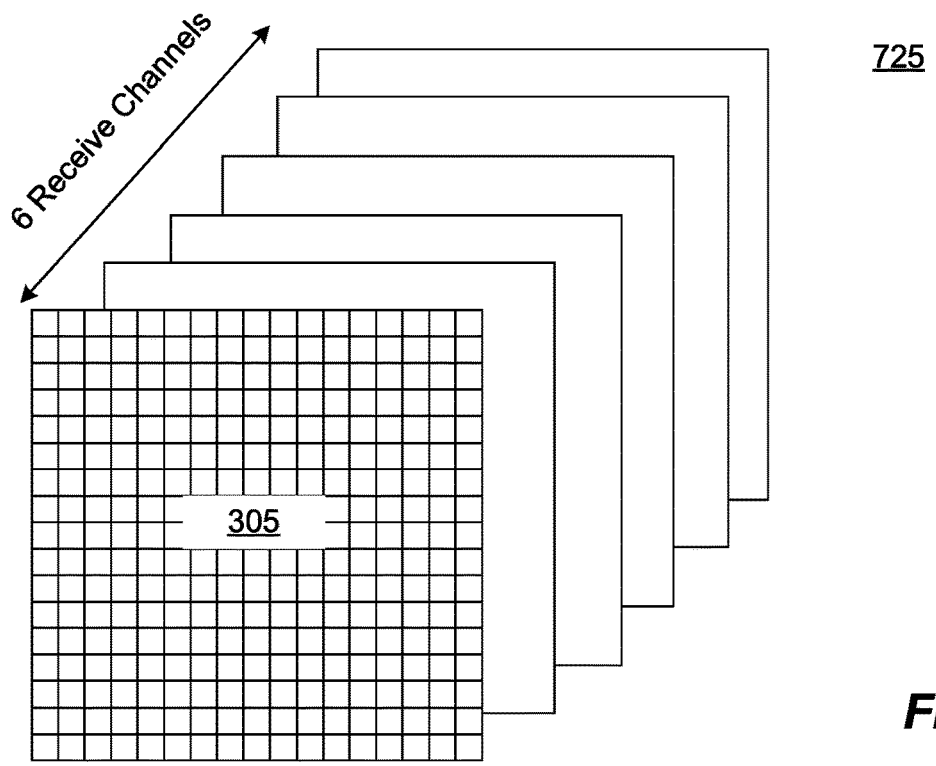

FIGS. 7B-7C illustrate an example reduction of data by using a subset of antenna elements for a highway scenario. As described in more detail above in the example of FIG. 3, each 2D matrix 305 corresponds to one of the receiver channels of the radar system, so the number of 2D matrices 305 formed from the data measured is equal to the number of antenna elements of the antenna array that are selected to transmit and receive the radar signals. As illustrated in the example of FIGS. 7B-7C, as the number of receiver channels or antenna elements being used changes, the size of the radar data cube expands or contracts. As illustrated in the example of FIG. 7B, radar data cube 720 has a particular size based on the entire number of receive channels (e.g., 32 receive channels) of a radar system being coupled to antenna elements. In contrast, when a subset of antenna elements (e.g., 6 antenna elements) is connected to the receive channels, the size of radar data cube 725 is reduced to the number of antenna elements that are connected to a receive channel, as illustrated in the example of FIG. 7C. In other words, if the number of antenna elements used to transmit radar signals and receive the reflected signals from objects is decreased, the computational and memory burden decreases proportionally to the number of antenna elements used. By focusing the radar signal transmission and data acquisition to a subset of antenna elements, the computational and memory burden of storing and processing the radar data cube (e.g., 725) may be significantly reduced.

Figure 8:
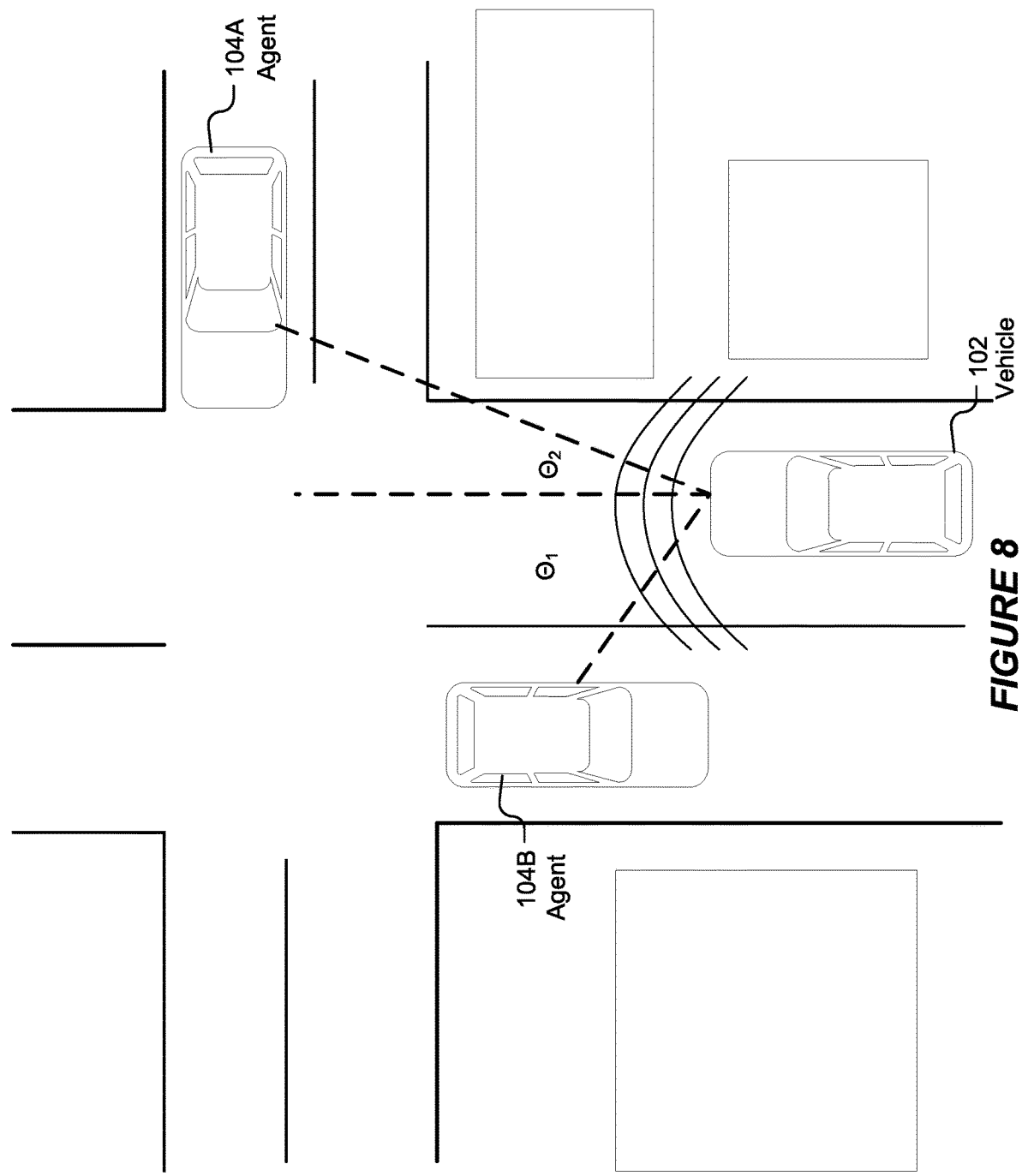
FIG. 8 illustrates an example city scenario of a vehicle detecting objects using a subset of an antenna array.

FIG. 8 illustrates an example city scenario of a vehicle detecting objects using a subset of an antenna array. As illustrated in the example of FIG. 8, a scenario 800 may correspond to vehicle 102 traveling on a city street with agent 104A traveling through an intersection in a direction perpendicular and agent 104B traveling in the opposite direction to vehicle 102. In particular embodiments, city scenario 800 may be determined based on sensor data indicating the location of agents, localization information (e.g., GPS data), map data (e.g., location of buildings), and image data (e.g., lane markings roads, and intersections) indicating vehicle 102 is traveling on a city street. As an example and not by way of limitation, in city scenario 800, determining azimuth angle $\Theta_1$ associated with agent 104B and azimuth angle $\Theta_2$ associated with agent 104A within the full FOV of the radar system is of particular importance to driving-system navigation, but only within a limited range (e.g., 50 meters) of vehicle 102. In addition, determining the elevation angle of objects within a limited elevation window is sufficient. As an example and not by way of limitation, the radar parameters of scenario 800 may correspond to a 180° azimuth angle FOV with a limited elevation window and relatively low SNR to capture to the movement of agents 104A-104B.

Figure 9:
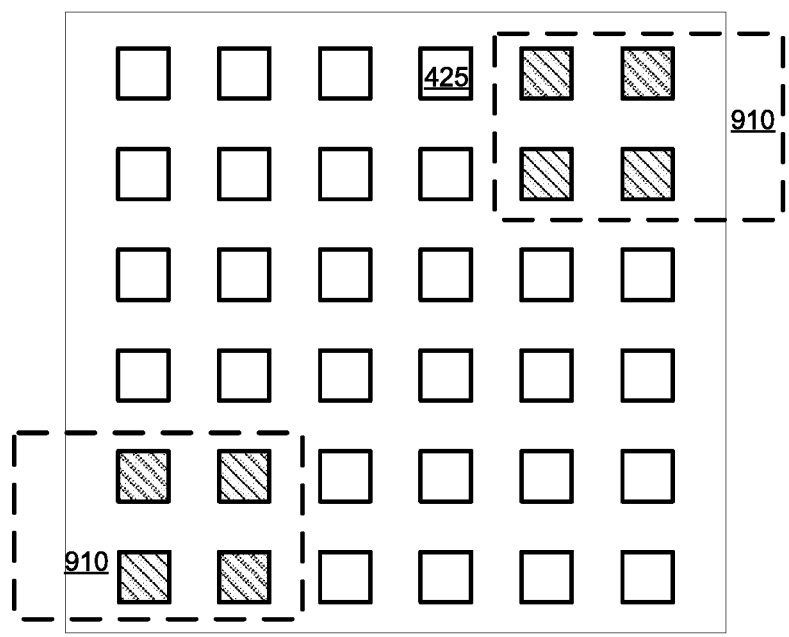
FIG. 9 illustrates an example subset of antenna elements for a city scenario.

FIG. 9 illustrates an example subset of antenna elements for a city scenario. In the example of FIG. 8, the city scenario is focused on determining the azimuth angle of agents in the radar system FOV within a limited range of the vehicle is of particular importance, while determining the elevation angle is only necessary within a limited range of elevation and distance. In the city scenario, long-range agent detection may not be of particular importance, therefore having a high signal-to-noise ratio (SNR) of the radar signal may not be particularly useful. Given the radar parameters for the scenario, described in more detail above, example transmission parameters may correspond to a relatively low number of antenna elements 425 along the elevation dimension for a relatively low-resolution determination of elevation angle of agents within a wide FOV with a relatively low number of antenna elements 425 to achieve the desired SNR. Given these transmission parameters, the microprocessor of the radar system may configure the switching network to couple antenna elements 425 of antenna array 410 to include a number of groups 910 of antenna elements 425 that covers the azimuth dimension but excludes a number of antenna elements 425. Because of the relatively large spacing between groups 910 of antenna elements 425, the radar system of the vehicle may register one or more grating lobes in elevation, but the accurate resolution of the objects at high elevations is not crucial to successful navigation of the city scenario. As illustrated and discussed in the example of FIGS. 7B-7C, by focusing the radar signal transmission and data acquisition to a subset of antenna elements, the computational and memory burden of storing and processing a radar data cube may be significantly reduced.

Figure 10:
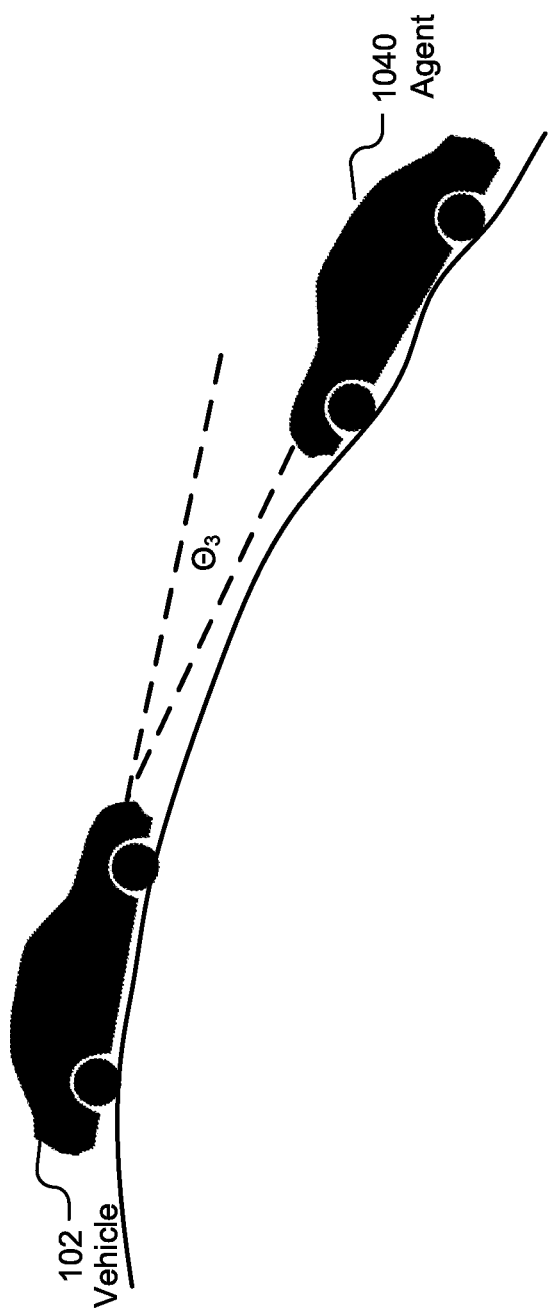
FIG. 10 illustrates an example downhill scenario of a vehicle detecting objects using a subset of an antenna array.

FIG. 10 illustrates an example downhill scenario of a vehicle detecting objects using a subset of an antenna array. As illustrated in the example of FIG. 10, a scenario 1000 may correspond to vehicle 102 traveling downhill with agent 1040 traveling uphill. In particular embodiments, downhill scenario 1000 may be determined based on GPS data, map data, and IMU data (e.g., angle of the vehicle 102) indicating vehicle 102 is traveling downhill. As an example and not by way of limitation, in downhill scenario 1000, determining elevation angle $\Theta_3$ and the azimuth angle associated with agent 1040 within the full FOV (e.g., ±40° of elevation) of the radar system is of particular importance to driving-system navigation of downhill scenario 1000. As an example and not by way of limitation, the radar parameters of scenario 1000 may correspond to a ±40° elevation angle and wide-azimuth angle FOV with a relatively low SNR to capture the movement of agent 1040.

Figure 11:
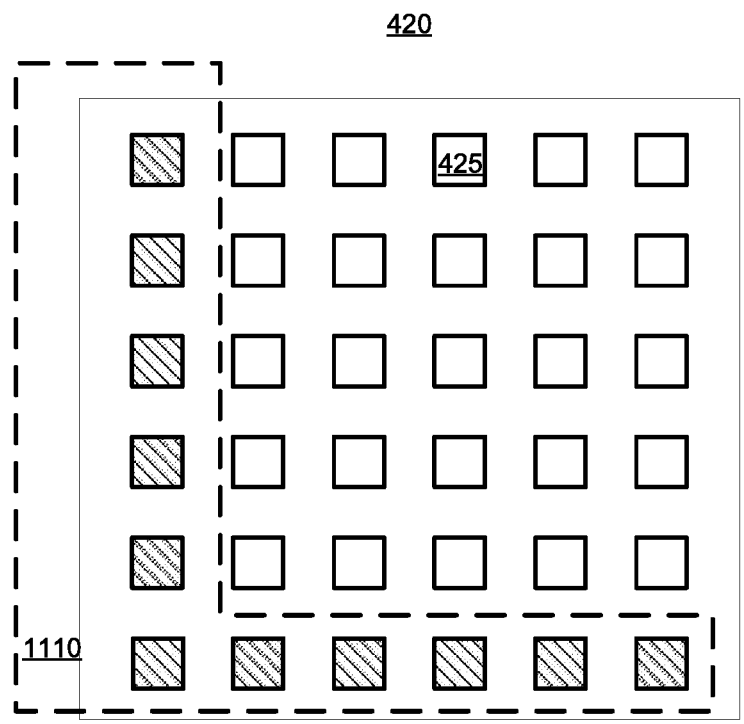
FIG. 11 illustrates an example subset of antenna elements for a downhill scenario.

FIG. 11 illustrates an example subset of antenna elements for a downhill scenario. In the example of FIG. 10, the downhill scenario is focused on determining the elevation angle and azimuth angle of agents in the radar system FOV is of particular importance. Given the radar parameters for the scenario, described in more detail above, example transmission parameters may correspond to a relatively high number of antenna elements 425 along the elevation angle dimension for a high-resolution determination of the elevation angle of agents within a ±40° elevation angle FOV with a relatively low number of antenna elements 425 to achieve the desired SNR. Given these transmission parameters, the microprocessor of the radar system may configure the switching network to couple antenna elements 425 of antenna array 410 to include an L-shaped group 1110 of antenna elements 425 that covers the azimuth dimension and elevation dimension. As illustrated and discussed in the example of FIGS. 7B-7C, by focusing the radar signal transmission and data acquisition to a subset of antenna elements, the computational and memory burden of storing and processing a radar data cube may be significantly reduced.

Figure 12:
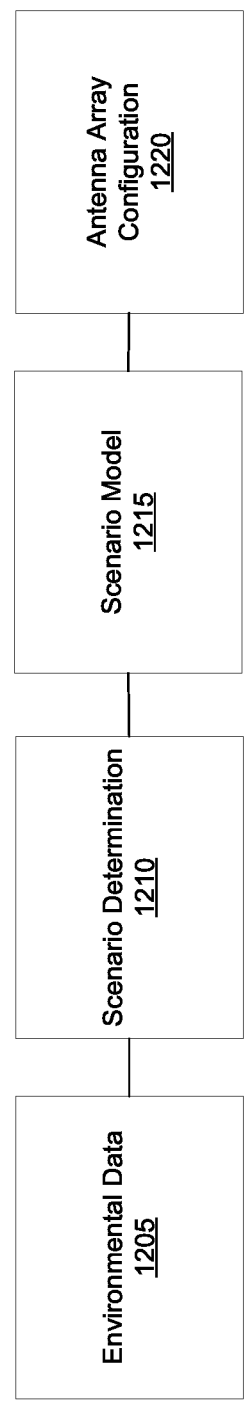
FIG. 12 illustrates an example computing architecture for configuring a sparse radar array.

FIG. 12 illustrates an example computing architecture for configuring a sparse radar array. Scenario determination module 1210 may receive environmental data 1205 to determine a scenario of the vehicle. In particular embodiments, environmental data 1205 may include sensor data (e.g., inertial measurement unit (IMU) or LiDAR), GPS data, map data, or semantic data of the map data. In addition, environmental data 1205 may further include topography data (e.g., building location, building geometry, or building height) based on map data.

A scenario module 1215 may analyze the results from scenario determination module 1210 to determine one or more criteria or constraints for the subset of the antenna elements. As an example and not by way of limitation, scenario module 1215 may determine based on the output of scenario determination module 1210 that the vehicle is currently in a highway scenario, as illustrated in the example of FIG. 6, and that information regarding the azimuth angle of agents is of particular importance, but information to determine the elevation angle is not particularly useful. As another example, scenario module 1215 may determine based on the output of scenario determination module 1210 that the vehicle is currently in a downhill scenario, as illustrated in the example of FIG. 10, and that information regarding the azimuth angle the elevation angle of agents is of particular importance. In particular embodiments, scenario model 1215 may be a machine-learning (ML) model that is trained based on previously recorded sensor data from vehicles that have previously navigated the area that the vehicle is currently traversing. Scenario model 1215 adjust the criteria for the subset of the antenna elements based on the training data. An antenna configuration module 1220 may receive the constraints for the subset of the antenna elements and provide data to the switching network to couple individual antenna elements to implement the configuration that matches the constraints received from scenario module 1215.

Figure 13:
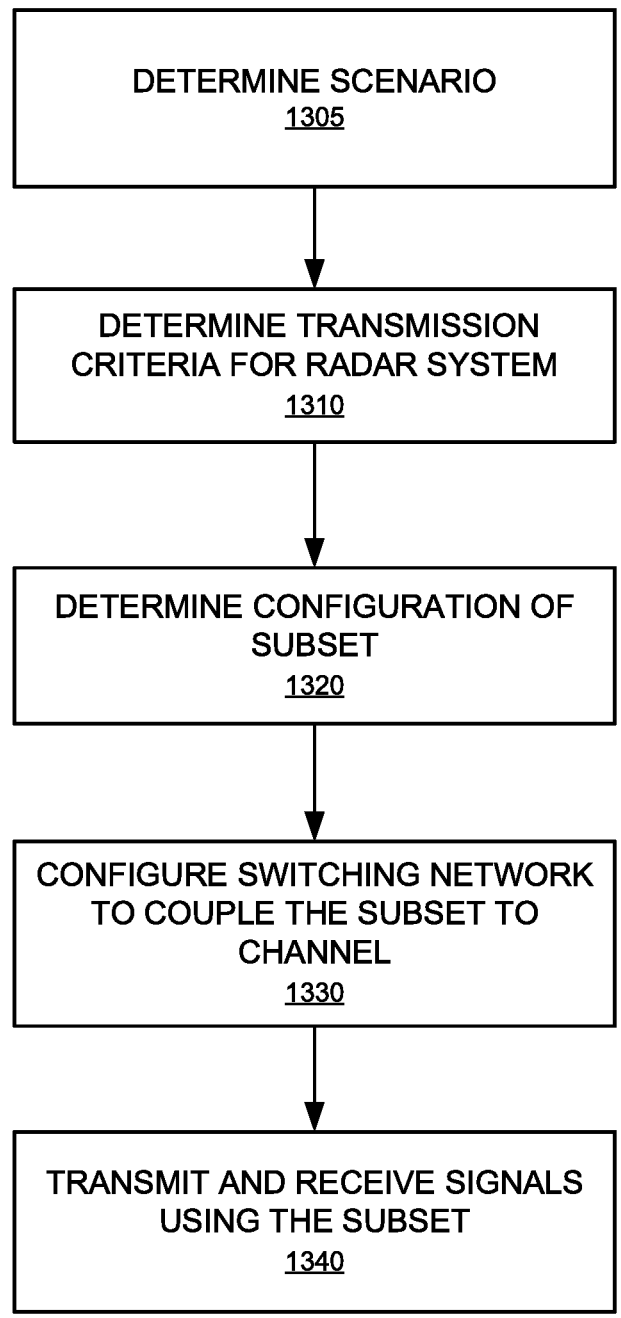
FIG. 13 illustrates an example method for configuring a sparse radar array.

FIG. 13 illustrates a method for configuring a sparse radar array. In particular embodiments, the method 1300 may begin at step 1305, where the computing system may determine a scenario based on sensor data or global-positioning system (GPS) data. As an example and not by way of limitation, the computing system may determine the one or more criteria of the subset of the number of antenna elements based on the scenario of the vehicle. At step 1310, a computing system may determine one or more transmission criteria for a subset of a number of antenna elements. As an example and not by way of limitation, one or more of the transmission criteria may include a resolution or granularity of the azimuth angle or elevation angle within the FOV or a number of antenna elements to achieve a determined amount of SNR of the radar signal. In particular embodiments, the transmission criteria may be determined based on radar parameters associated with the scenario. As an example and not by way of limitation, the radar parameters associated with the scenario may include an amount or range of the azimuth angle or elevation angle coverage to provide the field of view (FOV) or an amount of signal-to-noise ratio (SNR) of the radar signal. At step, 1320, the computing system may determine a configuration of the subset of the plurality of antenna elements satisfying the one or more transmission criteria. As an example and not by way of limitation, the configuration of the subset may be an L-shaped configuration based on determining the vehicle is in a downhill scenario. At step 1330, the computing system may configure a switching network to couple each antenna element of the subset of antenna elements to a corresponding receiving channel and a corresponding transmitting channel. At step 1340, the computing system may cause the radar system to transmit and receive signals using the configuration.

Particular embodiments may repeat one or more steps of the method of FIG. 13, where appropriate. Although this disclosure describes and illustrates particular steps of the method of FIG. 13 as occurring in a particular order, this disclosure contemplates any suitable steps of the method of FIG. 13 occurring in any suitable order. Moreover, although this disclosure describes and illustrates an example method for configuring a sparse radar array including the particular steps of the method of FIG. 13, this disclosure contemplates any suitable method for configuring a sparse radar array including any suitable steps, which may include all, some, or none of the steps of the method of FIG. 13, where appropriate. Furthermore, although this disclosure describes and illustrates particular components, devices, or systems carrying out particular steps of the method of FIG. 13, this disclosure contemplates any suitable combination of any suitable components, devices, or systems carrying out any suitable steps of the method of FIG. 13.

Figure 14A:
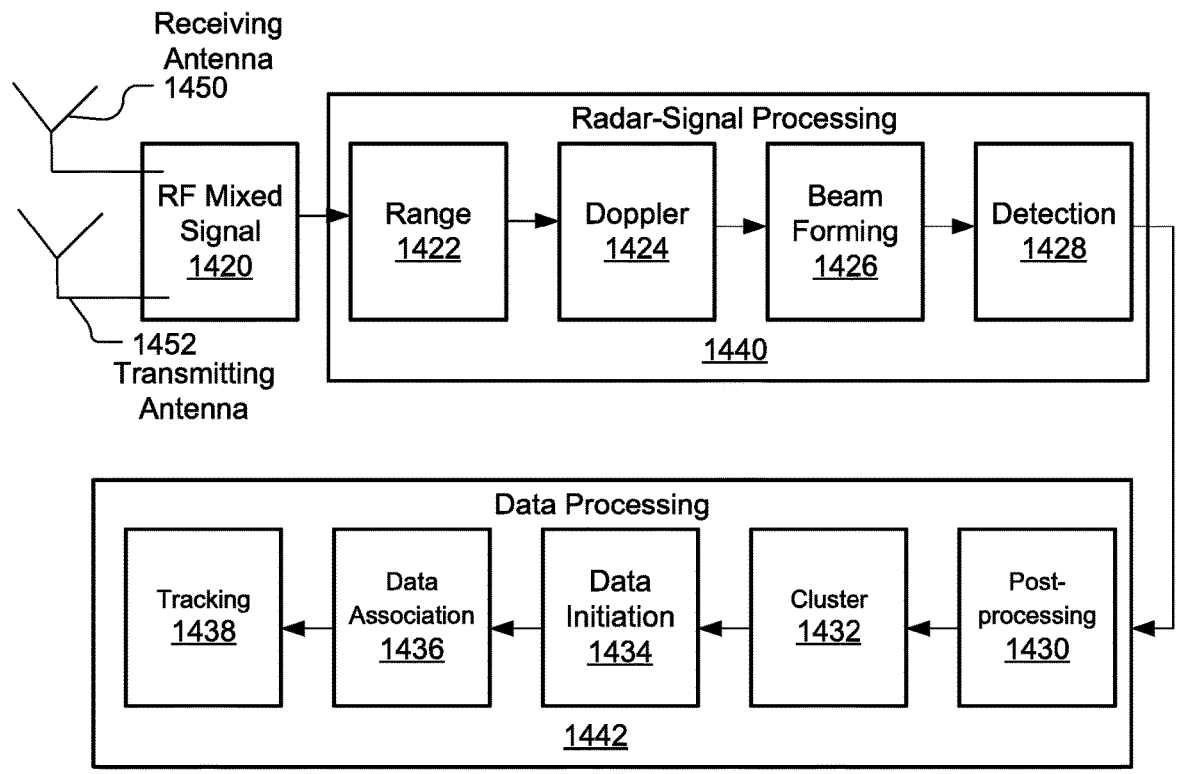
FIGS. 14A-14B illustrate an example radar system.
Figure 14B:
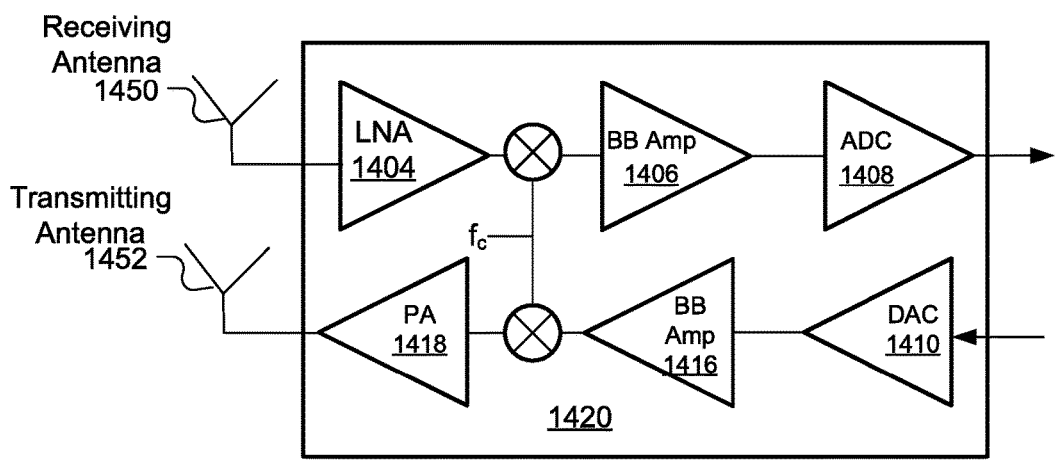

FIGS. 14A-14B illustrate a schematic of an example radar system. As illustrated in the example of FIG. 14A, a radar system 1400 may include a receiving antenna 1450, transmitting antenna 1452, as well as a number of modules, such as a RF (radio-frequency) mixed-signal module 1420, radar-signal processing module 1440, and data-processing module 1442. As described in more detail below, radar-signal processing module 1440, that includes range processing module 1422, doppler processing module 1424, beam forming module 1420, and detection module 1425. Data processing module 1442 includes post-processing module 1430, clustering module 1432, data initiation/termination 1434, data association 1436, and tracking module 1438.

Radar-signal processing module 1440 processes the reflected radar signals from RF mixed-signal module 1420 to extract information of objects in the field of view of the radar system. Range processing module 1422 of radar-signal processing module 1440 may perform a mathematical transformation of the radar data to determine the distance or range of an object (e.g., agent) from the vehicle to the object by measuring the elapsed time between sending the radar signal and receiving the reflected signal from the object. Doppler processing module 1424 may perform a mathematical transformation of the radar data from the time domain to the frequency domain to determine the velocity or Doppler of an object (e.g., agent) by measuring the frequency shift of the radar signal transmitted and the radar signal reflected by the object. Beam-forming module 1426 may perform a mathematical transformation of the radar data to determine the azimuth or lateral angle of an object (e.g., agent) by measuring the electronic phase scanning the radar signals. Detection module 1428 may associate the range, Doppler, and azimuth data of the radar data to a particular object.

Data-processing module 1440 processes the reflected radar signals from RF mixed-signal module 1420 to extract information of objects in the field of view of the radar system. Post-processing module 1430 may take the data vector contained in the Doppler, range, azimuth angle information from radar-signal processing module 1440 and converts this data into relatable object and spatial information. Cluster module 1432 may take the data from post-processing module and determine clusters that may represent the data points obtained from post-processing module 1430. In particular embodiment, data initiation/termination module 1434 may determine whether and when the determined cluster is tracked as an agent (e.g., a moving object) and when to terminate the tracking. Data association module 1436 may associate clusters of points from radar data captured at different times as representing the same object. In particular embodiments, the output of tracking module 1438 may track a cluster of data points that represents a moving or static object from radar data captured at different times RF mixed-signal module 1420 may transmit radar signals from transmitting antenna 1452 and receive radar signals reflected by objects in the field of view of the radar system from receiving antenna 1450. As illustrated in the example of FIG. 14B, the receiving side of RF mixed-signal module 1420 includes a low-noise amplifier (LNA) 1404, baseband amplifier 1406, and analog-to-digital converter (ADC) 1408. LNA 1404 receives the reflected radar signals through receiving antenna 1450 and since the received signals may be relatively low power, LNA 1404 amplifies the signal while introducing minimal noise. The mixer on the receiving side of RF mixed-signal module 1420 shifts the received radar signals from the carrier frequency ($f_c$) to the baseband frequency (low frequency). Baseband amplifier 1406 amplifies the baseband radar signals to ADC 1408. ADC 1408 converts the received signals from the analog domain to the digital domain for downstream signal processing by the data-processing module 1440.

As illustrated in the example of FIG. 14B, the transmission side of RF mixed-signal module 1420 includes a digital-to-analog converter (DAC) 1410, baseband amplifier 1416, mixer, and power amplifier (PA) 1418. A separate microcontroller determines one or more characteristics of the radar signals to be transmitted. As an example and not by way of limitation, these characteristics may include the pulse repetition frequency (PRF) or type of pulses to be transmitted by transmitting antenna 1452. DAC 1410 receives the radar signals as an analog signal and converts the digital information to analog waveforms. Baseband amplifier 1416 amplifies the baseband (low frequency) radar signals to the transmission side mixer. The transmission side mixer upconverts the baseband radar signals to the carrier frequency that is suitable for transmission through the air. In particular embodiments, receiving antenna 1450 and transmitting antenna 1452 may be integrated into a single antenna.

Figure 15:
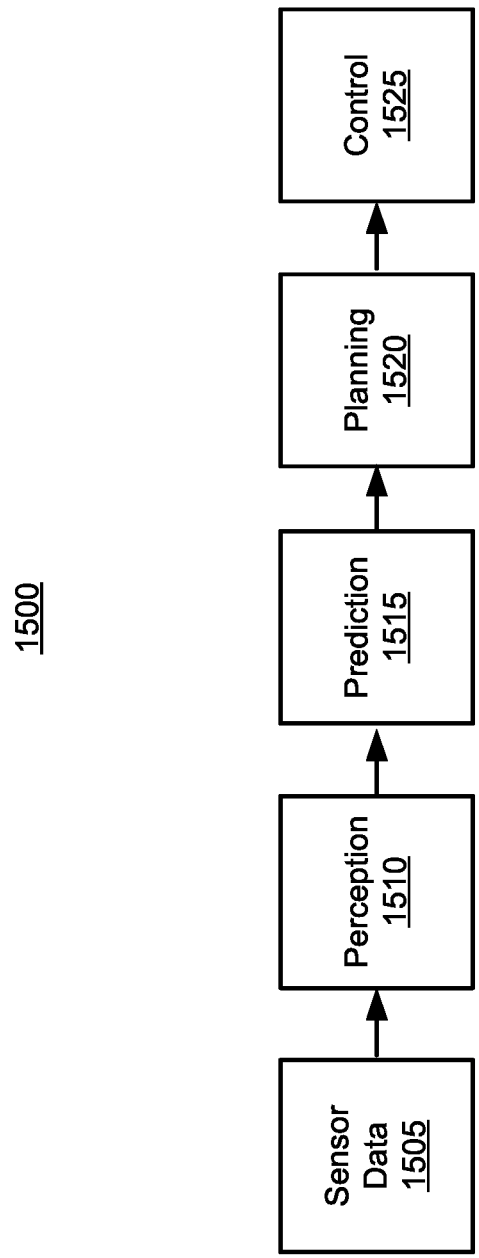
FIG. 15 illustrates an example driving-system navigation pipeline.

FIG. 15 illustrates an example block diagram of a driving-control navigation pipeline. In particular embodiments, a driving-control navigation pipeline 1500 may include a number of computing modules, such as a sensor data module 1505, perception module 1510, prediction module 1515, planning module 1520, and control module 1525. Sensor data module 1505 may obtain and preprocess sensor/telemetry data that is provided to perception module 1510. Such data may be captured by any suitable sensors of a vehicle. As an example and not by way of limitation, the vehicle may have a Light Detection and Ranging (LiDAR) sensor that is configured to transmit pulsed laser beams in multiple directions and measure the reflected signal from objects surrounding the vehicle. The time of flight of the light signals may be used to measure the distance or depth of the objects from the LiDAR. As another example, the vehicle may have optical cameras pointing in different directions to capture images of the vehicle's surroundings. Radar may also be used by the vehicle for detecting other vehicles and/or hazards at a distance. As further examples, the vehicle may be equipped with ultrasound for close-range object detection, e.g., parking and obstacle detection or infrared cameras for object detection in low-light situations or darkness. In particular embodiments, sensor data module 1505 may suppress noise in the sensor data or normalize the sensor data.

Perception module 1510 is responsible for correlating and fusing the data from the different types of sensors of the sensor module 1505 to model the contextual environment of the vehicle. Perception module 1510 may use information extracted by multiple independent sensors to provide information that would not be available from any single type of sensors. Combining data from multiple sensor types allows the perception module 1510 to leverage the strengths of different sensors and more accurately and precisely perceive the environment. As an example and not by way of limitation, image-based object recognition may not work well in low-light conditions. This may be compensated by sensor data from LiDAR or radar, which are effective sensors for measuring distances to targets in low-light conditions. As another example, image-based object recognition may mistakenly determine that an object depicted in a poster is an actual three-dimensional object in the environment. However, if depth information from a LiDAR is also available, the perception module 1510 could use that additional information to determine that the object in the poster is not, in fact, a three-dimensional object.

Perception module 1510 may process the available data (e.g., sensor data, data from a high-definition map, etc.) to derive information about the contextual environment. For example, perception module 1510 may include one or more agent modelers (e.g., object detectors, object classifiers, or machine-learning models trained to derive information from the sensor data) to detect and/or classify agents present in the environment of the vehicle (e.g., other vehicles, pedestrians, moving objects). Perception module 1510 may also determine the various characteristics of the agents. For example, perception module 1510 may track the velocities, moving directions, accelerations, trajectories, relative distances, or relative positions of these agents. In particular embodiments, perception module 1510 may also leverage information from a high-definition map. The high-definition map may include a precise three-dimensional model of the environment, including buildings, curbs, street signs, traffic lights, and any stationary fixtures in the environment. Using the vehicle's GPS data and/or image-based localization techniques (e.g., simultaneous localization and mapping, or SLAM), the perception module 1510 could determine the pose (e.g., position and orientation) of the vehicle or the poses of the vehicle's sensors within the high-definition map. The pose information, in turn, may be used by the perception module 1510 to query the high-definition map and determine what objects are expected to be in the environment.

Perception module 1510 may use the sensor data from one or more types of sensors and/or information derived therefrom to generate a representation of the contextual environment of the vehicle. As an example and not by way of limitation, the representation of the contextual environment may include objects such as other vehicles, curbs, debris, objects, and pedestrians. The contextual representation may be limited to a maximum range of the sensor array (e.g., 50, 100, or 200 meters). The representation of the contextual environment may include information about the agents and objects surrounding the vehicle, as well as semantic information about the traffic lanes, traffic rules, traffic signs, time of day, weather, and/or any other suitable information. The contextual environment may be represented in any suitable manner. As an example and not by way of limitation, the contextual representation may be encoded as a vector or matrix of numerical values, with each value in the vector/matrix corresponding to a predetermined category of information. For example, each agent in the environment may be represented by a sequence of values, starting with the agent's coordinate, classification (e.g., vehicle, pedestrian, etc.), orientation, velocity, trajectory, and so on. Alternatively, information about the contextual environment may be represented by a raster image that visually depicts the agent, semantic information, etc. For example, the raster image may be a birds-eye view of the vehicle and its surroundings, up to a predetermined distance. The raster image may include visual information (e.g., bounding boxes, color-coded shapes, etc.) that represent various data of interest (e.g., vehicles, pedestrians, lanes, buildings, etc.).

The representation of the present contextual environment from the perception module 1510 may be consumed by a prediction module 1515 to generate one or more predictions of the future environment. For example, given a representation of the contextual environment at time t, prediction module 1515 may output another contextual representation for time $t_1$. For instance, if the t contextual environment is represented by a raster image, the output of the prediction module 1515 may be another raster image (e.g., a snapshot of the current environment) that depicts where the agents would be at time $t_1$ (e.g., a snapshot of the future). In particular embodiments, prediction module 1515 may include a machine-learning model (e.g., a convolutional neural network, a neural network, a decision tree, support vector machines, etc.) that may be trained based on previously recorded contextual and sensor data. For example, one training sample may be generated based on a sequence of actual sensor data captured by a vehicle at times t and $t_1$. The captured data at times t and $t_1$ may be used to generate, respectively, a first contextual representation (the training data) and a second contextual representation (the associated ground-truth used for training). During training, the machine-learning model may process the first contextual representation using the model's current configuration parameters and output a predicted contextual representation. The predicted contextual representation may then be compared to the known second contextual representation (i.e., the ground-truth at time $t_1$). The comparison may be quantified by a loss value, computed using a loss function. The loss value may be used (e.g., via back-propagation techniques) to update the configuration parameters of the machine-learning model so that the loss would be less if the prediction were to be made again. The machine-learning model may be trained iteratively using a large set of training samples until a convergence or termination condition is met. For example, training may terminate when the loss value is below a predetermined threshold. Once trained, the machine-learning model may be used to generate predictions of future contextual representations based on current contextual representations.

Planning module 1520 may determine the navigation routes and particular driving operations (e.g., slowing down, speeding up, stopping, swerving, etc.) of the vehicle based on the predicted contextual representation generated by the prediction module 1515. In particular embodiments, planning module 1520 may utilize the predicted information encoded within the predicted contextual representation (e.g., predicted location or trajectory of agents, semantic data, etc.) and any other available information (e.g., map data, traffic data, accident reports, weather reports, target destinations, and any other suitable information) to determine one or more goals or navigation instructions for the vehicle. As an example and not by way of limitation, based on the predicted behavior of the agents surrounding the vehicle and the traffic data to a particular destination, planning module 1520 may determine a particular navigation path and associated driving operations for the vehicle to avoid possible collisions with one or more agents. In particular embodiments, planning module 1520 may generate, based on a given predicted contextual presentation, several different plans (e.g., goals or navigation instructions) for the vehicle. For each plan, the planning module 1520 may compute a score that represents the desirability of that plan. For example, if the plan would likely result in the vehicle colliding with an agent at a predicted location for that agent, as determined based on the predicted contextual representation, the score for the plan may be penalized accordingly. Another plan that would cause the vehicle to violate traffic rules or take a lengthy detour to avoid possible collisions may also have a score that is penalized, but the penalty may be less severe than the penalty applied for the previous plan that would result in a collision. A third plan that causes the vehicle to simply stop or change lanes to avoid colliding with the agent in the predicted future may receive the highest score. Based on the assigned scores for the plans, the planning module 1520 may select the best plan to carry out. While the example above used a collision as an example, the disclosure herein contemplates the use of any suitable scoring criteria, such as travel distance or time, fuel economy, changes to the estimated time of arrival at the destination, passenger comfort, proximity to other vehicles, the confidence score associated with the predicted contextual representation, etc.

Based on the plan generated by planning module 1520, which may include one or more navigation path or associated driving operations, control module 1525 may determine the specific commands to be issued to the actuators of the vehicle. The actuators of the vehicle are components that are responsible for moving and controlling the vehicle. The actuators control driving functions of the vehicle, such as, for example, steering, turn signals, deceleration (braking), acceleration, gear shift, etc. As an example and not by way of limitation, control module 1525 may transmit commands to a steering actuator to maintain a particular steering angle for a particular amount of time to move a vehicle on a particular trajectory to avoid agents predicted to encroach into the area of the vehicle. As another example, control module 1525 may transmit commands to an accelerator actuator to have the vehicle safely avoid agents predicted to encroach into the area of the vehicle.

Figure 16:
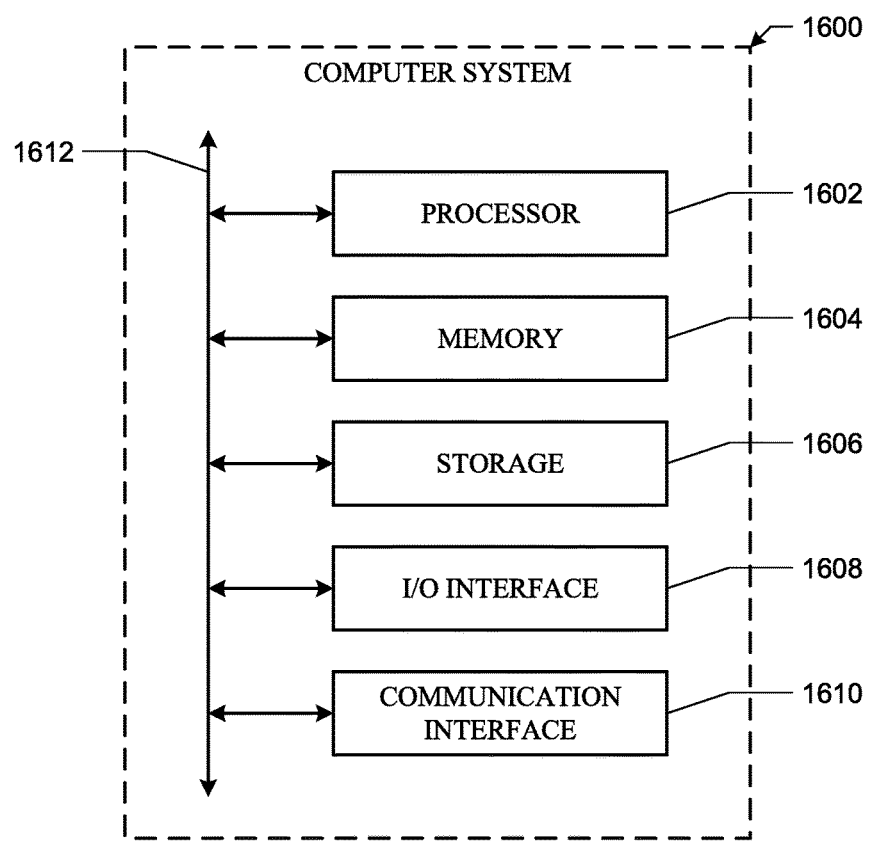
FIG. 16 illustrates an example of a computing system.

FIG. 16 illustrates an example computer system. In particular embodiments, one or more computer systems 1600 perform one or more steps of one or more methods described or illustrated herein. In particular embodiments, one or more computer systems 1600 provide the functionalities described or illustrated herein. In particular embodiments, software running on one or more computer systems 1600 performs one or more steps of one or more methods described or illustrated herein or provides the functionalities described or illustrated herein. Particular embodiments include one or more portions of one or more computer systems 1600. Herein, a reference to a computer system may encompass a computing device, and vice versa, where appropriate. Moreover, a reference to a computer system may encompass one or more computer systems, where appropriate.

This disclosure contemplates any suitable number of computer systems 1600. This disclosure contemplates computer system 1600 taking any suitable physical form. As example and not by way of limitation, computer system 1600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1600 may include one or more computer systems 1600; be unitary or distributed; span multiple locations; span multiple machines; span multiple data centers; or reside in a cloud, which may include one or more cloud components in one or more networks. Where appropriate, one or more computer systems 1600 may perform without substantial spatial or temporal limitation one or more steps of one or more methods described or illustrated herein. As an example and not by way of limitation, one or more computer systems 1600 may perform in real time or in batch mode one or more steps of one or more methods described or illustrated herein. One or more computer systems 1600 may perform at different times or at different locations one or more steps of one or more methods described or illustrated herein, where appropriate.

In particular embodiments, computer system 1600 includes a processor 1602, memory 1604, storage 1606, an input/output (I/O) interface 1608, a communication interface 1610, and a bus 1612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1602 includes hardware for executing instructions, such as those making up a computer program. As an example and not by way of limitation, to execute instructions, processor 1602 may retrieve (or fetch) the instructions from an internal register, an internal cache, memory 1604, or storage 1606; decode and execute them; and then write one or more results to an internal register, an internal cache, memory 1604, or storage 1606. In particular embodiments, processor 1602 may include one or more internal caches for data, instructions, or addresses. This disclosure contemplates processor 1602 including any suitable number of any suitable internal caches, where appropriate. As an example and not by way of limitation, processor 1602 may include one or more instruction caches, one or more data caches, and one or more translation lookaside buffers (TLBs). Instructions in the instruction caches may be copies of instructions in memory 1604 or storage 1606, and the instruction caches may speed up retrieval of those instructions by processor 1602. Data in the data caches may be copies of data in memory 1604 or storage 1606 that are to be operated on by computer instructions; the results of previous instructions executed by processor 1602 that are accessible to subsequent instructions or for writing to memory 1604 or storage 1606; or any other suitable data. The data caches may speed up read or write operations by processor 1602. The TLBs may speed up virtual-address translation for processor 1602. In particular embodiments, processor 1602 may include one or more internal registers for data, instructions, or addresses. This disclosure contemplates processor 1602 including any suitable number of any suitable internal registers, where appropriate. Where appropriate, processor 1602 may include one or more arithmetic logic units (ALUs), be a multi-core processor, or include one or more processors 1602. Although this disclosure describes and illustrates a particular processor, this disclosure contemplates any suitable processor.

In particular embodiments, memory 1604 includes main memory for storing instructions for processor 1602 to execute or data for processor 1602 to operate on. As an example and not by way of limitation, computer system 1600 may load instructions from storage 1606 or another source (such as another computer system 1600) to memory 1604. Processor 1602 may then load the instructions from memory 1604 to an internal register or internal cache. To execute the instructions, processor 1602 may retrieve the instructions from the internal register or internal cache and decode them. During or after execution of the instructions, processor 1602 may write one or more results (which may be intermediate or final results) to the internal register or internal cache. Processor 1602 may then write one or more of those results to memory 1604. In particular embodiments, processor 1602 executes only instructions in one or more internal registers or internal caches or in memory 1604 (as opposed to storage 1606 or elsewhere) and operates only on data in one or more internal registers or internal caches or in memory 1604 (as opposed to storage 1606 or elsewhere). One or more memory buses (which may each include an address bus and a data bus) may couple processor 1602 to memory 1604. Bus 1612 may include one or more memory buses, as described in further detail below. In particular embodiments, one or more memory management units (MMUs) reside between processor 1602 and memory 1604 and facilitate accesses to memory 1604 requested by processor 1602. In particular embodiments, memory 1604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1604 may include one or more memories 1604, where appropriate. Although this disclosure describes and illustrates particular memory, this disclosure contemplates any suitable memory.

In particular embodiments, storage 1606 includes mass storage for data or instructions. As an example and not by way of limitation, storage 1606 may include a hard disk drive (HDD), a floppy disk drive, flash memory, an optical disc, a magneto-optical disc, magnetic tape, or a Universal Serial Bus (USB) drive or a combination of two or more of these. Storage 1606 may include removable or non-removable (or fixed) media, where appropriate. Storage 1606 may be internal or external to computer system 1600, where appropriate. In particular embodiments, storage 1606 is non-volatile, solid-state memory. In particular embodiments, storage 1606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1606 taking any suitable physical form. Storage 1606 may include one or more storage control units facilitating communication between processor 1602 and storage 1606, where appropriate. Where appropriate, storage 1606 may include one or more storages 1606. Although this disclosure describes and illustrates particular storage, this disclosure contemplates any suitable storage.

In particular embodiments, I/O interface 1608 includes hardware, software, or both, providing one or more interfaces for communication between computer system 1600 and one or more I/O devices. Computer system 1600 may include one or more of these I/O devices, where appropriate. One or more of these I/O devices may enable communication between a person and computer system 1600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1608 for them. Where appropriate, I/O interface 1608 may include one or more device or software drivers enabling processor 1602 to drive one or more of these I/O devices. I/O interface 1608 may include one or more I/O interfaces 1608, where appropriate. Although this disclosure describes and illustrates a particular I/O interface, this disclosure contemplates any suitable I/O interface.

In particular embodiments, communication interface 1610 includes hardware, software, or both providing one or more interfaces for communication (such as, for example, packet-based communication) between computer system 1600 and one or more other computer systems 1600 or one or more networks. As an example and not by way of limitation, communication interface 1610 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 1610 for it. As an example and not by way of limitation, computer system 1600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1600 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 1600 may include any suitable communication interface 1610 for any of these networks, where appropriate. Communication interface 1610 may include one or more communication interfaces 1610, where appropriate. Although this disclosure describes and illustrates a particular communication interface, this disclosure contemplates any suitable communication interface.

In particular embodiments, bus 1612 includes hardware, software, or both coupling components of computer system 1600 to each other. As an example and not by way of limitation, bus 1612 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1612 may include one or more buses 1612, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
determining one or more transmission criteria for a radar system, the radar system having a plurality of antenna elements, wherein the plurality of antenna elements have a random spacing between adjacent antenna elements, wherein the random spacing includes a spacing component that is larger than half of a length of a carrier frequency and a random offset that randomizes the spacing component to cause the plurality of antenna elements to have a random spacing that is irregular;
determining a configuration of a selected subset of the plurality of antenna elements satisfying the one or more transmission criteria, wherein determining the configuration includes determining the one or more transmission criteria based on radar parameters associated with a scenario associated with a vehicle, and selecting the configuration of the selected subset of the plurality of antenna elements to meet the one or more transmission criteria and cause the radar system to accurately capture positions and movements of agents associated with the scenario, wherein the radar parameters specify parameters to provide a field of view (FOV) and an amount of signal-to-noise ratio (SNR) of the signals optimized for the scenario;
configuring a switching network to couple each antenna element of the selected subset of the plurality of the antenna elements to a corresponding receiving channel and a corresponding transmitting channel; and
causing the radar system to transmit and receive signals using the selected subset of the plurality of the antenna elements.

2. The method of claim 1, wherein determining the configuration further comprises:
determining the scenario associated with the vehicle.

3. The method of claim 2, wherein the scenario is determined based on sensor data of the vehicle, global-positioning system (GPS) data, or map data.

4. The method of claim 2, wherein the radar parameters comprise an amount or range of an azimuth angle or an elevation angle coverage to provide the FOV the amount of signal-to-noise ratio (SNR) of the signals.

5. The method of claim 1, wherein one or more of the one or more transmission criteria comprise a resolution of an azimuth angle or elevation angle within the FOV or a number of antenna elements to achieve a determined amount of SNR of the signals, and
   wherein configuring the switching network activates the selected subset of the plurality of the antenna elements for respective functions of transmitting and receiving to conserve resources by avoiding activation of the plurality of antenna elements.

6. The method of claim 1, wherein determining the configuration further comprises selecting one or more antenna elements in at least one dimension of the plurality of antenna elements based on the one or more transmission criteria, wherein the plurality of the antenna elements is spatially distributed as a two-dimensional array.

7. The method of claim 1, wherein the random spacing configures the plurality of antenna elements to provide a larger field-of-view (FOV) without extracting spurious data from grating lobes by cancelling out the grating lobes through superposition of responses in the plurality of antenna elements.

8. The method of claim 7, wherein the random spacing is larger than a distance defined by a grating lobe of the plurality of antenna elements.

9. The method of claim 7, wherein the random spacing is a function of a wavelength of a carrier frequency range of the radar system, and wherein the random offset is separately defined for the plurality of antenna elements.

10. The method of claim 1, wherein the selected subset of the plurality of the antenna elements comprises a plurality of groups of the selected subset of the plurality of the antenna elements that are separated by a distance larger than a grating lobe spacing of the radar system.

11. One or more computer-readable non-transitory storage media embodying software that is operable when executed to cause one or more processors to perform operations comprising:
   determining one or more transmission criteria for a radar system, the radar system having a plurality of antenna elements, wherein the plurality of antenna elements have a random spacing between adjacent antenna elements, wherein the random spacing includes a spacing component that is larger than half of a length of a carrier frequency and a random offset that randomizes the spacing component to cause the plurality of antenna elements to have a random spacing that is irregular;
   determining a configuration of a selected subset of the plurality of antenna elements satisfying the one or more transmission criteria, wherein determining the configuration includes determining the one or more transmission criteria based on radar parameters associated with a scenario associated with a vehicle, and selecting the configuration of the selected subset of the plurality of antenna elements to meet the one or more transmission criteria and cause the radar system to accurately capture positions and movements of agents associated with the scenario, wherein the radar parameters specify parameters to provide a field of view (FOV) and an amount of signal-to-noise ratio (SNR) of the signals optimized for the scenario;
   configuring a switching network to couple each antenna element of the selected subset of the plurality of the antenna elements to a corresponding receiving channel and a corresponding transmitting channel; and
   causing the radar system to transmit and receive signals using the selected subset of the plurality of the antenna elements.

12. The media of claim 11, wherein the software is further operable to:
   determine the scenario associated with the vehicle.

13. The media of claim 12, wherein the scenario is determined based on sensor data of a vehicle, global-positioning system (GPS) data, or map data.

14. The media of claim 12, wherein the radar parameters comprise an amount or range of an azimuth angle or an elevation angle coverage to provide the FOV the amount of signal-to-noise ratio (SNR) of the signals.

15. The media of claim 11, wherein one or more of the one or more transmission criteria comprise a resolution of an azimuth angle or elevation angle within the FOV or a number of antenna elements to achieve a determined amount of SNR of the signals, and
   wherein configuring the switching network activates the selected subset of the plurality of the antenna elements for respective functions of transmitting and receiving to conserve resources by avoiding activation of the plurality of antenna elements.

16. A radar system comprising:
   a plurality of antenna elements;
   a switching network coupled to the plurality of antenna elements, wherein the switching network is configured to couple a subset of the plurality of antenna elements to a corresponding receiving channel and a corresponding transmitting channel;
   one or more processors coupled to the switching network; and
   one or more computer-readable non-transitory storage media coupled to the one or more processors, the one or more computer-readable non-transitory storage media comprising instructions operable to cause the processors to perform operations comprising:
      determining one or more transmission criteria for a radar system, the radar system having a plurality of antenna elements, wherein the plurality of antenna elements have a random spacing between adjacent antenna elements, wherein the random spacing includes a spacing component that is larger than half of a length of a carrier frequency and a random offset that randomizes the spacing component to cause the plurality of antenna elements to have a random spacing that is irregular;
      determining a configuration of a selected subset of the plurality of antenna elements satisfying the one or more transmission criteria, wherein determining the configuration includes determining the one or more transmission criteria based on radar parameters associated with a scenario associated with a vehicle, and selecting the configuration of the selected subset of the plurality of antenna elements to meet the one or more transmission criteria and cause the radar system to accurately capture positions and movements of agents associated with the scenario, wherein the radar parameters specify parameters to provide a field of view (FOV) and an amount of signal-to-noise ratio (SNR) of the signals optimized for the scenario;
configuring a switching network to couple each antenna element of the selected subset of the plurality of the antenna elements to a corresponding receiving channel and a corresponding transmitting channel; and
causing the radar system to transmit and receive signals using the selected subset of the plurality of the antenna elements.

17. The system of claim 16, wherein the processors are further operable to:
determine the scenario associated with vehicle.

18. The system of claim 17, wherein the scenario is determined based on sensor data of the vehicle, global-positioning system (GPS) data, or map data.

19. The system of claim 17, wherein the radar parameters comprise an amount or range of an azimuth angle or an elevation angle coverage to provide the FOV the amount of signal-to-noise ratio (SNR) of the signals.

20. The system of claim 16, wherein one or more of the one or more transmission criteria comprise a resolution of an azimuth angle or elevation angle within the FOV or a number of antenna elements to achieve a determined amount of SNR of the signals, and
wherein configuring the switching network activates the selected subset of the plurality of the antenna elements for respective functions of transmitting and receiving to conserve resources by avoiding activation of the plurality of antenna elements.

* * * * *